United States Patent
N et al.

(10) Patent No.: US 12,323,825 B2
(45) Date of Patent: Jun. 3, 2025

(54) TRANSPORT REFRIGERATION EQUIPMENT CONNECT TO WI-FI NETWORKS FOR DATA TRANSMISSION TO BACKEND

(71) Applicant: Carrier Corporation, Palm Beach Gardens, FL (US)

(72) Inventors: Anantha Krishnan N, Telangana (IN); Pradeep Reddy Sanaga, Telangana (IN); Sharath Kumar Bekkesi Gandla, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 331 days.

(21) Appl. No.: 17/897,855

(22) Filed: Aug. 29, 2022

(65) Prior Publication Data
US 2023/0068915 A1 Mar. 2, 2023

Related U.S. Application Data

(60) Provisional application No. 63/238,909, filed on Aug. 31, 2021.

(51) Int. Cl.
*H04W 24/02* (2009.01)
*H04W 76/15* (2018.01)
(Continued)

(52) U.S. Cl.
CPC ........... *H04W 24/02* (2013.01); *H04W 76/15* (2018.02); *B60H 1/00585* (2013.01); *H04W 84/12* (2013.01)

(58) Field of Classification Search
CPC ..... H04W 24/02; H04W 76/15; H04W 84/12; H04W 4/80; H04W 12/50; H04W 12/63; H04W 76/16; H04L 63/18; G06Q 10/0833
See application file for complete search history.

(56) References Cited

U.S. PATENT DOCUMENTS 7,379,805 B2  5/2008 Olsen, III et al.
8,461,958 B2  6/2013 Saenz et al.
(Continued)

FOREIGN PATENT DOCUMENTS

CN  104142655 A  11/2014
CN  206178381 U  5/2017
(Continued)

OTHER PUBLICATIONS

Anonymous; "Wi Fi—How to Set Signal Strength Threshold for Switching WiFi On and Off—Android Enthusiastics Stack Exchange" Sep. 13, 2015; 3 Pages.
(Continued)

*Primary Examiner* — Hassan A Phillips
*Assistant Examiner* — Prenell P Jones
(74) *Attorney, Agent, or Firm* — CANTOR COLBURN LLP

(57) ABSTRACT

Provided are embodiments for a method and system for managing equipment connections to Wi-Fi networks for data transmission to backend systems. The embodiments can include determining a location of a first container, and transmitting credential information to a controller of the first container over a first connection based on the determined location. Embodiments can also include receiving an acknowledgment from the first container over the first connection, and enabling communication with the first container over a second connection using the credential information, wherein the first connection is different than the second connection.

14 Claims, 4 Drawing Sheets

(51) Int. Cl.
*B60H 1/00* (2006.01)
*H04W 84/12* (2009.01)

(56) References Cited

U.S. PATENT DOCUMENTS

| | | |
|---|---|---|
| 9,555,772 B2 | 1/2017 | Walker et al. |
| 9,815,681 B2 | 11/2017 | McQuade et al. |
| 9,990,845 B2 | 6/2018 | Zografos |
| 10,560,329 B2 | 2/2020 | Iannce et al. |
| 10,621,674 B2 | 4/2020 | Jones et al. |
| 10,743,159 B2 | 8/2020 | Ameixieira |
| 10,858,053 B2 | 12/2020 | Bean et al. |
| 10,930,138 B2 | 2/2021 | Raasch et al. |
| 10,951,651 B1* | 3/2021 | Golan ................. H04L 63/1425 |
| 11,134,098 B1* | 9/2021 | Lieberman .......... H04L 63/1425 |
| 2010/0235891 A1 | 9/2010 | Oglesbee et al. |
| 2011/0221573 A1 | 9/2011 | Huat |
| 2011/0291828 A1 | 12/2011 | Walker et al. |
| 2012/0190386 A1* | 7/2012 | Anderson ............... G01S 19/14 455/456.3 |
| 2013/0238456 A1* | 9/2013 | Soysa ................... G06Q 20/387 705/21 |
| 2013/0290256 A1* | 10/2013 | Barrall ..................... G06F 16/27 707/634 |
| 2013/0290464 A1* | 10/2013 | Barrall .................. G06F 15/167 709/213 |
| 2015/0058956 A1 | 2/2015 | Tipton et al. |
| 2015/0134557 A1 | 5/2015 | Cova et al. |
| 2015/0333965 A1* | 11/2015 | Lee ....................... H04W 84/12 370/254 |
| 2016/0098870 A1* | 4/2016 | Bergerhoff ............. H04W 4/48 340/5.61 |
| 2016/0212118 A1* | 7/2016 | Barrall .................... H04L 63/08 |
| 2017/0034215 A1 | 2/2017 | Sigel et al. |
| 2018/0308052 A1 | 10/2018 | Fain et al. |
| 2019/0236870 A1* | 8/2019 | Niles ................. H04W 12/068 |
| 2020/0084495 A1* | 3/2020 | Ghosh ............... H04N 21/4627 |
| 2020/0249070 A1* | 8/2020 | Gurumohan .......... G01F 23/804 |
| 2020/0296779 A1 | 9/2020 | Moghe et al. |
| 2021/0099441 A1* | 4/2021 | Suraparaju ............ H04W 12/33 |
| 2024/0105330 A1* | 3/2024 | Bondarenko .......... H04W 4/38 |

FOREIGN PATENT DOCUMENTS

| | | |
|---|---|---|
| CN | 108519786 A | 9/2018 |
| CN | 112460907 A | 3/2021 |
| KR | 1020140026975 A | 3/2014 |
| WO | 2018000986 A1 | 1/2018 |
| WO | 2020117998 A1 | 6/2020 |

OTHER PUBLICATIONS

European Search Report for Application No. 22192973.0; Issued Jan. 18, 2023; 11 Pages.
Marder, A. "Using Geofencing to Automate Logistics, Timekeeping, and Shipping," Oct. 19, 2017, Logistics Technology, 9 pages.
Ruiz-Garcia, L., et al., "Review. Monitoring the intermodal, refrigerated transport of fruit using sensor networks," Oct. 19, 2017, Spanish Journal of Agricultural Research, vol. 5, No. 2, pp. 142-156.

* cited by examiner

TRANSPORT REFRIGERATION EQUIPMENT CONNECT TO WI-FI NETWORKS FOR DATA TRANSMISSION TO BACKEND

CROSS-REFERENCE TO RELATED APPLICATIONS

This application claims the benefit of U.S. Provisional Application No. 63/238,909 filed Aug. 31, 2021, the disclosure of which is incorporated herein by reference in its entirety.

BACKGROUND

The present invention relates to wireless communication, and more specifically, to managing transport refrigeration equipment connections to Wi-Fi networks for data transmission to backend system.

Refrigerated containers are commonly used to transport perishable cargo, such as, for example, produce, meat, poultry, fish, dairy products, cut flowers, and other fresh or frozen perishable products. A transport refrigeration system can be mounted to the container in operative association with a cargo space for maintaining a controlled temperature environment within the cargo space. The containers can include various components for communicating and receiving updates with the backend service. Various updates can range in the amount of bandwidth that is consumed over the network. For example, the operations can include simple application downloads to large firmware updates. There may be a need to efficiently manage the selected network communications based on the location of the container.

BRIEF DESCRIPTION

According to an embodiment, a method for managing transport refrigeration equipment connections to Wi-Fi networks for data transmission to backend system is provided. The method can include determining a location of a first container, and transmitting credential information to a controller of the first container over a first connection based on the determined location. The method can also include receiving an acknowledgment from the first container over the first connection, and enabling communication with the first container over a second connection using the credential information, wherein the first connection is different than the second connection.

In addition to one or more of the features described herein, or as an alternative, further embodiments include simultaneously maintaining the first connection and the second connection.

In addition to one or more of the features described herein, or as an alternative, further embodiments include using a first connection that is a cellular connection and a second connection that is a Wi-Fi connection.

In addition to one or more of the features described herein, or as an alternative, further embodiments include using credential information that is maintained in a backend system.

In addition to one or more of the features described herein, or as an alternative, further embodiments include using a backend system that shares the credentials with a plurality of containers over the first connection network.

In addition to one or more of the features described herein, or as an alternative, further embodiments include transmitting a signal to the first container to delay cellular transmission and to subsequently transmit data over the Wi-Fi network based on the location of the first container.

In addition to one or more of the features described herein, or as an alternative, further embodiments include automatically switching from the first connection to the second connection.

In addition to one or more of the features described herein, or as an alternative, further embodiments include automatically switching from the first connection to the second connection based at least in part on a signal strength of the second connection.

According to another embodiment, a system for managing transport refrigeration equipment connections to Wi-Fi networks for data transmission to backend system is provided.

Technical effects of embodiments of the present disclosure include conserving cellular data limits by prioritizing Wi-Fi connections for data intensive operations.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

In today's environment, the refrigerated containers can include components for communicating with the backend service and for detecting and maintaining the temperature of the refrigerated container. It is know that cellular networks is more expensive and charge higher rates than using Wi-Fi networks for communication. Current transport refrigeration systems do not have a means for identifying and connecting to any available Wi-Fi networks. The costs for performing large updates or downloads over the cellular network can be prohibitive. Therefore, there may be a need to utilize more efficient networks connections based on the detected locations of object and/or container.

Figure 1:
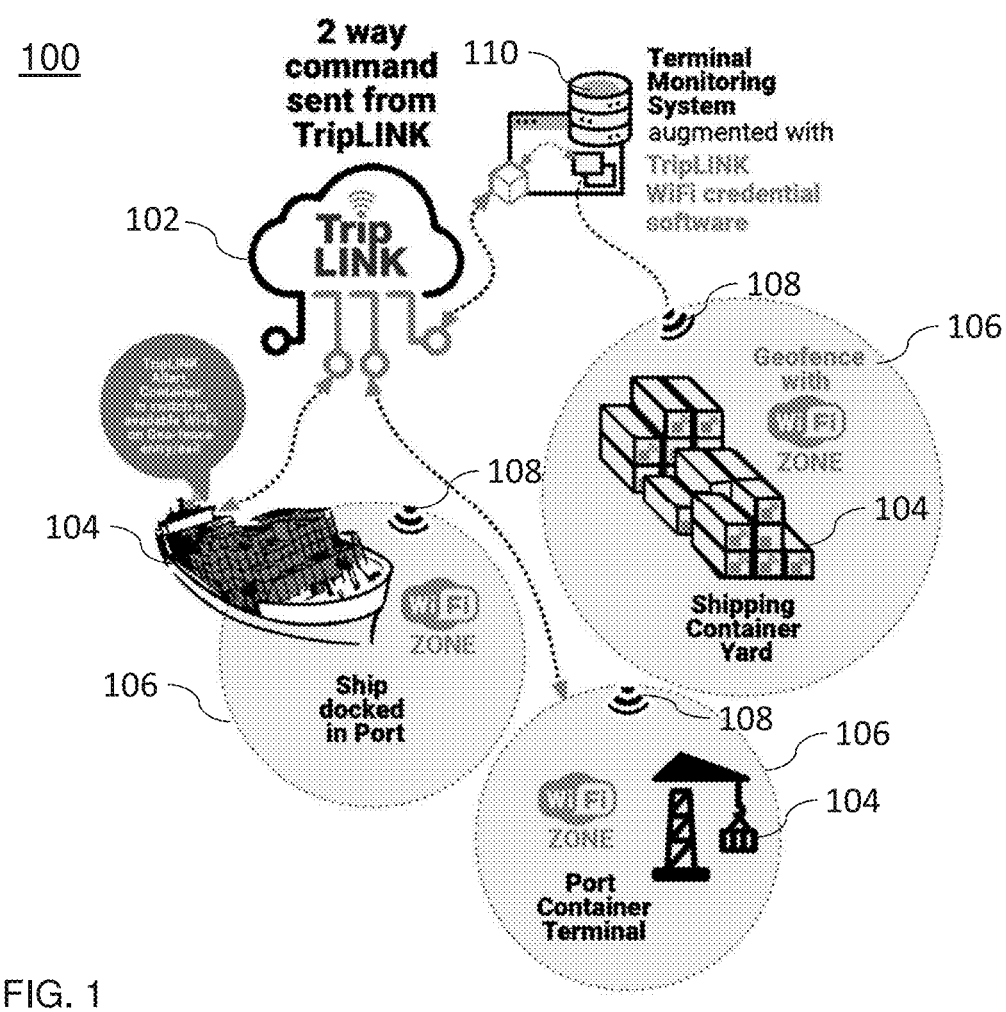
FIG. 1 depicts a timing diagram for communication between the network and a controller of the transport refrigeration container.
Figure 2:
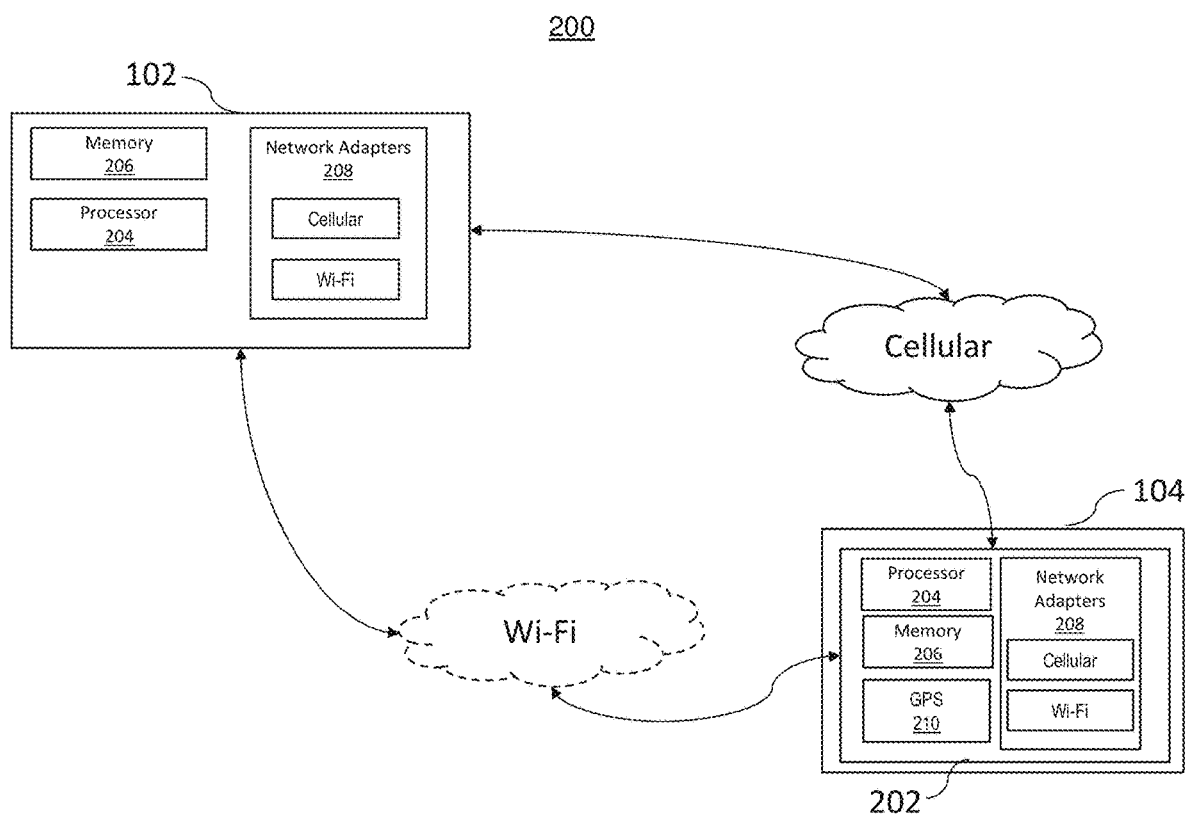
FIG. 2 depicts a controller for a back-end server and a controller of the transport refrigeration container in accordance with one or more embodiments of the disclosure.

FIG. 1 depicts a system 100 for managing transport refrigeration equipment connections to Wi-Fi networks for data transmission to backend system in accordance with one or more embodiments of the disclosure. In example embodiments, the back-end service 102 communicates with the one or more containers 104 over a first network connection and a second network connection. In one or more embodiments of the disclosure, the container can include a plurality of components as shown in FIG. 2. As such, each container 104 can include a controller that are used to obtain data and communicate with the back-end service 102. The back-end service 102 can be configured to monitor the various conditions of the containers 104 including the temperature of the containers. In addition, the back-end service 102 can be configured to provide updates to the controllers of the containers 104. In one or more embodiments of the invention the first network connection provides a 2-way command over a cellular connection and the second network connection is a Wi-Fi connection. It can be appreciated that the network connections may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The containers 104 can be moved during transport and can be stored in various areas such as a shipping yard, on a ship in a port, or a port terminal. Each of the various areas may be associated with a geofence 106 that is used to track the location of the containers 104 and the geofence 106 may be associated with a Wi-Fi accessible zone through a Wi-Fi access point 108. In one or more embodiments of the disclosure, the controller is configured to communicate with a terminal monitoring system 110.

FIG. 1 depicts multiple scenarios for using for tracking the location of the container controllers and for sharing credentials for an available Wi-Fi network. In one non-limiting example, a container 104 in a "shipping container yard" scenario each container in the yard is equipped with a controller. The controller can maintain cellular connectivity to a back-end service 102. The cellular connectivity can be used to report the control parameters along with the location of the container 104 to the back-end service 102. The back-end service 102 is configured to track the location of each of the container 104 that is in communication. In addition, the back-end service 102 includes geo-fence services 106 which can detect the entry and exit of each of the containers 104.

In embodiments of the disclosure, various versions of the back-end service 102 can be installed or executed in the container yard/terminals. The version of the back-end service 102 which is executed in the container yard/terminals is configured to share the Wi-Fi network credentials along with its location to the back-end service 102. An administrator or user of the back-end service 102 can associate the container yard/terminal to the geo-fence service in the back-end system 102. Upon any entry of the containers 104 in the geo-fence 106 in the back-end service 102, the back-end service 102 can determine if there is an available Wi-Fi network that is associated with the geo-fence location. If there are any associated Wi-Fi networks available in the geo-fence location, the backend system can send the 2-way command to the container controller with the Wi-Fi network access and credentials. The container controller can connect to the Wi-Fi network and start communicating the telemetry and data download, firmware upgrade operations using the Wi-Fi network.

In a different scenario a container in a "port terminal container yard," the geo-fence 106 may be large but the Wi-Fi network might not be accessible in the geo-fence entry. In this scenario, the back-end service 102 can calculate the distance between the location of the available Wi-Fi terminal and the container 104, and the backend service can perform a distance calculation of the container location and Wi-Fi zone. When the current location of the container is within the vicinity of the Wi-Fi network inside the geo-fence the 2-way command can be initiated to share the Wi-Fi credentials of the available network. It can be appreciated the proximity to the Wi-Fi network can be based on a defined configurable threshold distance between the Wi-Fi network and the container 104.

In a different scenario when a container on a ship is arriving and the ship will be "docked in the port." Upon entry into the geo-fence, the back-end service 102 can send a command to initiate the second network connection. During transport the telemetry data is not communicated to the back-end service 102 but is stored in the controller memory of the container 104. If the ship is transporting 100 containers, the container controllers will detect a cellular signal on reaching the port and begin transmitting the stored messages to the back-end service 102. If the ship has arrived in the port area, there may be a time interval before it reaches the Wi-Fi network of the port. The back-end service 102 can send a 2-way command to the container controllers on the ship that have just arrived or docked at the port before sending the stored communication to the back-end service 102. In one or more embodiments of the disclosure, the container controller can be configured to only communicate any critical alarm information during this time and does not send all the stored data to the back-end service 102. Subsequently, the back-end service 102 will detect the location of the container to the Wi-Fi network zone and initiate the 2-way command with the Wi-Fi credentials when it is in the network vicinity.

FIG. 2 depicts an example of a back-end server 102 and a controller of a container 104 in accordance with one or more embodiments is shown. The back-end service 102 can include one or more processing units (processors) 204. Processors 204 are coupled to system memory 206 and various other components via a system bus. The system memory 206 can include read-only memory (ROM) and may include a basic input/output system (BIOS) (not shown), which controls certain basic functions of system 100. FIG. 2 further depicts a one or more network adapters 208 for enabling data processing system 100 to communicate with other such systems that may reside external to the back-end service. As shown in FIG. 2, the controller 202 of the container 104 also includes the processor 204, memory 206, and network adapter 208 similar to that of the back-end service. The network adapter 208 can include a first communication interface to enable communications over a cellular network and a second communication interface to enable communication over a Wi-Fi network. The controller 202 can also include a Global Positioning Systems (GPS) 210 is configured to determine positioning information indicative of a geographical position using one or more positioning systems or protocols of a type well known in the art, such as, Global Navigation System (GLONASS) or other known positioning systems.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 3:
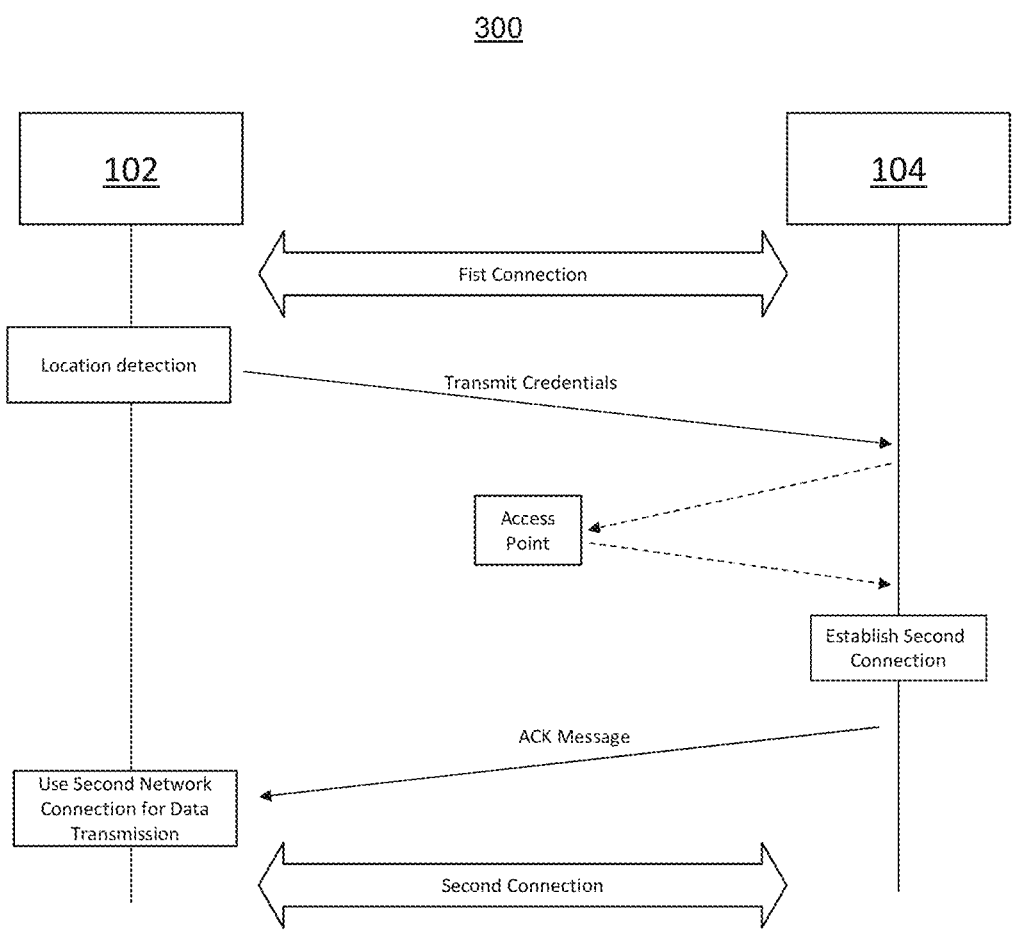
FIG. 3 depicts a system used to manage transport refrigeration equipment connections to Wi-Fi networks for data transmission to backend system in accordance with one or more embodiments of the disclosure.

FIG. 3 depicts a timing diagram for managing the network connections for a transport refrigeration unit in accordance with one or more embodiments of the disclosure. The timing diagram 300 begins by establishing a first network connection between the network controller and the controller of the container. In this non-limiting example, the first network connection is a cellular network connection.

The network controller 102 can detect the location of the container 104 by obtaining location information from the GPS of the container or obtaining other known location information. In one or more embodiments, the location of the container 104 can be determined to have entered a particular zone based on using geofence technology. The geofence technology can be used to monitor the containers 104 that are entering and exiting the zone. A Wi-Fi access point for communication may correspond to the zone corresponding to the geofence where a reliable Wi-Fi network connection is made available to devices that are within the zone.

It can be appreciated that a plurality of geofences/zones can be established with corresponding Wi-Fi access points can be provided in accordance with one or more embodiments of the disclosure. If it is determined that the container 104 has entered a zone, the network controller 102 can transmit the Wi-Fi network connection credentials to the container controller for communication. In some embodiments, backend/terminal system can include a version of the carrier backend system and uses that, the Wi-Fi network connection credentials are sent to the backend system along with the terminal locations associated geofence. In one or more embodiments, the credentials can include but is not limited to the network SSID, password, and other information required to log in to the Wi-Fi network. The container 104 controller can use the network credentials to establish the Wi-Fi network connection to an access point for communicating over the Wi-Fi network. After the Wi-Fi network connection is established the container controller can send an acknowledgment message to the network controller to switch the connection from the cellular network connection to the Wi-Fi network connection. It should be understood the cellular network connection can be maintained simultaneously with the Wi-Fi network connection or it can be terminated and reestablished when the Wi-Fi network connection may no longer be available or when needed.

In some embodiments, a threshold can be used to determine when the second network connection should be established. The second network connection can be used for the more bandwidth intensive communication such as large updates to firmware. The first network connection can still be maintained for communicating with the controller of the container.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
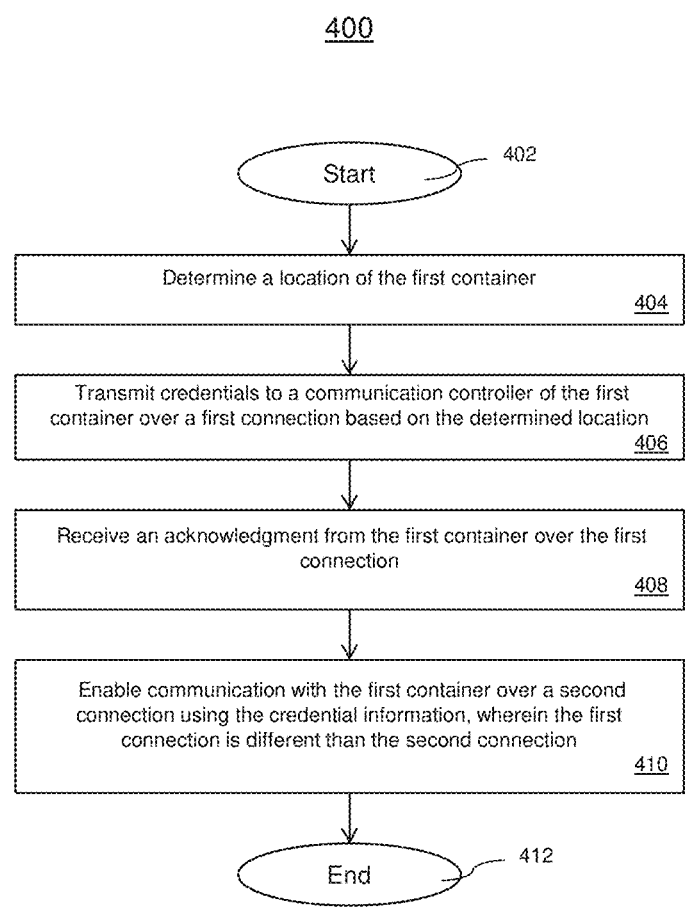
FIG. 4 depicts a flowchart of a method for managing transport refrigeration equipment connections to Wi-Fi networks for data transmission to backend system in accordance with one or more embodiments of the disclosure.

FIG. 4 depicts a flowchart of a method 400 for managing transport refrigeration equipment connections for data transmission to backend systems. The method 400 begins at block 402 and proceeds to block 404 which determines a location of a first container. The location of the container can be determined using GPS or other locator type technology that is collocated with the container. Block 406 transmits credential information to a controller of the first container over a first connection based on the determined location. The credential information can include network SSID and password. Block 408 receives an acknowledgment from the first container over the first connection. Block 410 enables communication with the first container over a second connection using the credential information, wherein the first connection is different than the second connection. In one or more embodiments of the disclosure, the first connection can be a cellular connection and the second connection can be a Wi-Fi connection. It should be understood that a different sequence of steps or other steps can be used and is not intended to be limited by the example shown in FIG. 4.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

The techniques described herein provide for a technique to leveraging existing connections by detecting a location of a container and automatically switching the connection from an expensive cellular network connection to a more cost-efficient Wi-Fi network connection.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for managing transport refrigeration equipment to connect to Wi-Fi networks for data transmission to backend systems, the method comprising:
   determining a location of a first container;
   transmitting credential information to a controller of the first container over a first connection based on the determined location;
   receiving an acknowledgment from the first container over the first connection; and
   enabling communication with the first container over a second connection using the credential information, wherein the first connection is different than the second connection;
   the method further comprising:
   the controller storing data during transport;
   transmitting a signal to the first container to delay cellular transmission of the data to a back-end service and to subsequently transmit the data to the back-end service over the Wi-Fi network based on the location of the first container.

2. The method of claim 1, further comprising simultaneously maintaining the first connection and the second connection.

3. The method of claim 1, wherein the first connection is a cellular connection and the second connection is a Wi-Fi connection.

4. The method of claim 1, wherein the credential information is maintained in a backend system.

5. The method of claim 4, wherein the backend system shares the credential information with a plurality of containers over the first connection network.

6. The method of claim 1, further comprising automatically switching from the first connection to the second connection.

7. The method of claim 6, wherein the automatically switching from the first connection to the second connection is based at least in part on a signal strength of the second connection.

8. A system for managing transport refrigeration equipment to connect to Wi-Fi networks for data transmission to backend systems, the system comprising:
   a controller of a first container;
   a backend system operably coupled to the controller, wherein the backend system is configured to:
   determine a location of a first container;
   transmit credential information to a controller of the first container over a first connection based on the determined location;
   receive an acknowledgment from the first container over the first connection; and
   enable communication with the first container over a second connection using the credential information, wherein the first connection is different than the second connection;
   wherein the controller is configured to store data during transport;
   wherein the system is configured to transmit a signal to the first container to delay cellular transmission of the data to a back-end service and to subsequently transmit the data to the back-end service over the Wi-Fi network based on the location of the first container.

9. The system of claim 8, further comprising simultaneously maintaining the first connection and the second connection.

10. The system of claim 8, wherein the first connection is a cellular connection and the second connection is a Wi-Fi connection.

11. The system of claim 8, wherein the credential information is maintained in the backend system.

12. The system of claim 11, wherein the backend system shares the credential information with a plurality of containers over the first connection network.

13. The system of claim 8, further comprising automatically switching from the first connection to the second connection.

14. The system of claim 13, wherein automatically switching from the first connection to the second connection is based at least in part on a signal strength of the second connection.

* * * * *